(12) United States Patent
Christiaens et al.

(10) Patent No.: US 8,762,338 B2
(45) Date of Patent: Jun. 24, 2014

(54) ANALYZING BACKUP OBJECTS MAINTAINED BY A DE-DUPLICATION STORAGE SYSTEM

(75) Inventors: Mark Christiaens, Aalter (BE); Nick Cremelie, Ghent (BE); Mark Vertongen, Wetterem (BE); Bastiaan Stougie, Melle (BE)

(73) Assignee: Symantec Corporation, Mountain View, CA (US)

( * ) Notice: Subject to any disclaimer, the term of this patent is extended or adjusted under 35 U.S.C. 154(b) by 668 days.

(21) Appl. No.: 12/705,306

(22) Filed: Feb. 12, 2010

(65) Prior Publication Data

US 2011/0082841 A1    Apr. 7, 2011

Related U.S. Application Data

(60) Provisional application No. 61/249,541, filed on Oct. 7, 2009.

(51) Int. Cl.
*G06F 7/00* (2006.01)
*G06F 17/00* (2006.01)
*G06F 17/30* (2006.01)

(52) U.S. Cl.
CPC .... *G06F 17/30917* (2013.01); *G06F 17/30569* (2013.01)
USPC .......................... 707/640; 707/649; 707/654

(58) Field of Classification Search
CPC ............ G06F 12/0804; G06F 13/4022; G06F 17/30917; G06F 1/04; G06F 21/568
USPC ............ 707/204, 674, 770; 711/162; 709/219
See application file for complete search history.

(56) References Cited

U.S. PATENT DOCUMENTS

| | | | |
|---|---|---|---|
| 6,892,250 B2 | 5/2005 | Hoskins | |
| 6,985,926 B1 | 1/2006 | Ferlauto et al. | |
| 7,152,060 B2 | 12/2006 | Borthwick et al. | |
| 7,287,019 B2 | 10/2007 | Kapoor et al. | |

(Continued)

OTHER PUBLICATIONS

Symantec NetBackup PureDisk™ Getting Started Guide; Windows, Linux, and UNIX; Publication release 6.6, revision 2; Copyright 2009, 111 pages; online at http://www.symantec.com/business/support/resources/sites/BUSINESS/content/live/TECHNICAL SOLUTION/75000/TECH75147/en_US/334167.pdf.

(Continued)

*Primary Examiner* — Susan Chen
(74) *Attorney, Agent, or Firm* — Meyertons Hood Kivlin Kowert & Goetzel, P.C.; Jeffrey C. Hood; Joel L. Stevens

(57) ABSTRACT

Analyzing backup objects maintained by a de-duplication server. A plurality of first objects may be maintained. Each first object may refer to second object(s) and each second object may refer back to at least one first object. For each respective first object, the respective first object may be analyzed to determine the one or more second objects referred to by the respective first object. Correspondingly, a command may be generated for each respective second object of the determined second object(s), thereby generating a plurality of commands. Each command may be used to verify that the respective second object refers back to the respective first object. The plurality of commands may be sorted into a disk access order. The commands may be used to verify that each second object refers back to first objects that refer to the second object.

20 Claims, 7 Drawing Sheets

(56) References Cited

U.S. PATENT DOCUMENTS

| | | | |
|---|---|---|---|
| 7,584,338 B1 | 9/2009 | Bricker et al. | |
| 7,644,136 B2* | 1/2010 | Rose et al. | 709/219 |
| 7,725,704 B1 | 5/2010 | Beaverson et al. | |
| 7,814,149 B1 | 10/2010 | Stringham | |
| 7,818,495 B2 | 10/2010 | Tanaka et al. | |
| 7,818,535 B1 | 10/2010 | Bono et al. | |
| 7,870,105 B2 | 1/2011 | Arakawa et al. | |
| 8,136,025 B1* | 3/2012 | Zhu et al. | 715/200 |
| 2009/0132616 A1* | 5/2009 | Winter et al. | 707/204 |
| 2009/0177855 A1* | 7/2009 | Drews et al. | 711/162 |
| 2010/0281077 A1 | 11/2010 | Lillibridge et al. | |
| 2011/0099200 A1* | 4/2011 | Blount et al. | 707/770 |
| 2011/0125716 A1* | 5/2011 | Drews et al. | 707/674 |

OTHER PUBLICATIONS

EMC Avamar Data Sheet; Next-generation backup and recovery with global, source data de-duplication; Apr. 2008; 4 pages; online at http://www.datanetworks.com/WhitePapers/EMC%20-%20Avamar%20Data%20Sheet.pdf.

Schedule a Data Verification Operation; Oct. 27, 2007, 1 page; online at http://documentation.commvault.com/commvault/release_7_0_0/books_online_1/english_us/features/data_verification/how_to/storpol_sched_verify_data.htm.

Data Domain; Data Invulnerability Architecture, The Ultimate in Data Integrity and Recoverability, Apr. 12, 2009, 2 pages; online at http://www.datadomain.com/products/DIA.html.

Press Release,Data Domain Delivers Breakthrough Protection and Simplicity in a Cost-Effective, Disk-Based Recovery Appliance, Jun. 9, 2003, 4 pages; online at http://www.datadomain.com/news/press_rel_060903.html.

Zhu, et al; "Avoiding the Disk Bottleneck in the Data Domain Deduplication File System"; USENIX Association; FAST '08: 6th USENIX Conference on File and Storage Technologies; 2008; pp. 269-282.

* cited by examiner

ANALYZING BACKUP OBJECTS MAINTAINED BY A DE-DUPLICATION STORAGE SYSTEM

PRIORITY CLAIM

This Application claims benefit of priority to U.S. Provisional Patent Application No. 61/249,541, titled "Backup System Including Deduplication Engine", which was filed on Oct. 7, 2009, whose inventors are Nick Cremelie, Bastiaan Stougie, Thomas Hartnett, Mark Vertongen, Mark Duchene, Weibao Wu, Michael Ng, Kemal "Mehmet" Balioglu, Mike Zeis, Chao "Mike" Lei, and Qing Fu "Simford" Dong, which is hereby incorporated by reference as though fully and completely set forth herein.

FIELD OF THE INVENTION

The present invention relates to systems for de-duplicating and storing data. More specifically, it relates to a method and system for analyzing backup objects maintained by a de-duplication storage system.

DESCRIPTION OF THE RELATED ART

Many of today's organizations rely on computer systems and computer data to perform important functions. Some organizations may operate multiple interconnected computer systems and these systems may produce data and/or receive data from external computer systems. Organizations may use computer data of different types, file sizes and file formats. While much of this data may be valuable to the organization, it may be easily lost (e.g., by computer system failure or by human error). Consequently, many organizations may take precautions against such potential loses by, for example, periodically backing up data to another system. Frequently, the backup system may reside at another physical location (e.g., a centralized backup facility), and in many cases, the backup facility will receive data from multiple locations (e.g., different offices of an organization) via a computer network (e.g., a private computer network or the Internet).

Backup facilities (and backup systems) typically manage tremendous quantities of data. For many reasons, including the quantity of data and the multiple sources of data, portions of one incoming data stream are often duplicated in another incoming data stream or in previously stored data. Managers of backup facilities generally strive (e.g., for cost reasons) to reduce the amount of storage space required to store data. A commonly used technique for reducing storage space is data de-duplication and computer storage servers that perform data de-duplication tasks are commonly referred to as de-duplication servers.

De-duplication servers may identify identical blocks of data in files and between files and store a single copy of each identical block for all files using it. A file's de-duplicated backup may thus include references to the blocks that make up the file. While this technique may make better use of available disk space, it may complicate the process of removing old data. For example, since multiple files may reference a particular data block, in some cases not all of the data blocks used by a file should be deleted when deleting that file from a de-duplicated backup.

Furthermore, de-duplicated backups are more sensitive to corruption than ordinary backups. For example, because de-duplicated backups share one copy of duplicate data, each data block represents a single point of failure. Thus, guarding against corruption is particularly important in de-duplicated backups. Accordingly, improvements in de-duplication methods, and in particular improvements that guard against corruption problems, would be desirable.

SUMMARY OF THE INVENTION

Described herein are embodiments relating to a system and method for efficiently analyzing and modifying backup objects maintained by a de-duplication server. For example, backup objects may be analyzed (verified) and possibly modified to address corruption issues. Embodiments of the invention may provide a more efficient method for performing verification of the backup objects.

A plurality of first backup objects may be maintained. Each first object may refer to one or more second objects. Accordingly, there may be a plurality of maintained second objects. In one embodiment, each second object may refer back to at least one first object. In one embodiment, the references may be pointers to memory addresses. As described herein, the first and second objects may be path objects and data objects, respectively, or data objects and segment objects, respectively, among other possibilities, as desired.

For each respective first object, the respective first object may be analyzed to determine the second object(s) referred to by the respective first object. Additionally, a command may be generated for each respective second object. Each command may be used for verifying that the respective second object refers back to the respective first object. Accordingly, this analysis and generation may result in the production of a plurality of commands.

As a simple example, there may be three first objects, and each first object may refer to two separate second objects (for a total of 6 second objects). Each second object may refer back to its parent first object. Correspondingly, the pairs of second objects may be determined for each first object, and a command may be generated for each second object to verify that the second object refers back to the proper first object. Thus, for this simple example, there may be a total of six commands. However, in some embodiments, different first objects may refer to the same second object.

Additionally, further commands may be generated for inclusion in the plurality of commands. For example, commands may be generated to verify the integrity of one of the second objects.

The plurality of commands may be sorted into a disk access order, and the second objects may be verified based on the plurality of commands. As indicated above, the verifications may correspond to integrity of the second object or accuracy of the reference(s) of the second object, among other possibilities. Thus, the commands may be sorted in a manner that makes the verification more efficient, e.g., by ensuring that the order of the commands is in an order that corresponds to storage of files to which the objects refer.

In one embodiment, the plurality of commands may be executable to perform the verification. However, the plurality of commands may simply store information which is usable to perform the verification rather than being executable themselves.

In some embodiments, the method may determine that one or more of the plurality of commands are duplicate commands. Since the commands are sorted in disk access order, this determination may be performed easily, since the duplicate commands should be adjacent to one another. Correspondingly, based on this determination, the verification may not repeat execution of the duplicate commands.

If an error is determined (e.g., a reference error) in one or more second objects during the verification, the error may be corrected. For example, a reference error from a second object to a first object may be determined based on the verification and the error may be corrected based on the determination.

The method may be performed on various hierarchies of data objects. For example, in one embodiment, the first objects may be path objects (e.g., representing metadata of a respective file) and the second objects may be data objects (e.g., representing one version of the respective file). Alternatively, the first objects may be data objects and the second objects may be segment objects (e.g., corresponding to raw data of the respective file). The method may be performed for either or both of these levels, in parallel or in sequence, as desired.

In an exemplary embodiment, the system and method efficiently verify the integrity of links between a hierarchy of objects in a de-duplication storage system. According to one embodiment of the method, backup software executing in the de-duplication storage system may receive a request to verify the data integrity of the links. The de-duplication storage system may include a storage database storing a plurality of data objects. Each data object may represent a particular file, but may not include the actual data of the file. Instead, the data object may include one or more forward links to one or more segment objects which may each include a data segment of the file. The segment objects may be stored in a particular order on a storage device.

In response to the request, the backup software may retrieve each respective data object from the storage database and process the data objects. Each respective data object may be processed by determining the one or more segment objects to which the respective data object has forward links. For each segment object to which the respective data object has a forward link, the backup software may add a command to a command list to verify that the segment object has a reverse link to the respective data object. In some embodiments, one or more commands for verifying the integrity of the data segments included in one or more of the segment objects may also be added to the list.

The backup software may then sort the commands in the command list by determining the segment object to which each command corresponds, and sorting the commands in the same order in which the segment objects are stored on the storage device. Sorting the commands may include sorting both commands for verifying that segment objects have reverse links to respective data objects and commands for verifying the integrity of the data segments included in one or more of the segment objects.

In some embodiments it may be determined that one or more of the commands in the command list are duplicate commands. The duplicate commands may be de-duplicated (removed), e.g., so that when the commands are processed the duplicate commands are not repeated.

The backup software may then process the commands in the command list in the sorted order. Each respective command may be processed according to what type of command it is. For example, each respective command for verifying that a segment objects has a reverse link to a respective data object may be processed by determining whether the respective segment object to which the respective command corresponds has a reverse link to the respective data object referenced by the command, and adding a reverse link from the respective segment object to the respective data object if the reverse link is not present. Each respective command for verifying the integrity of a data segment included in a segment objects may be processed by calculating a checksum (or performing any other integrity verifying procedure) for the respective segment object referred to by the respective command.

In some embodiments, the de-duplication storage system may include a storage database storing a plurality of path objects. Each path object may include meta-data for a particular file and may include one or more forward links to one or more data objects. The data objects may be stored in a particular order on a storage device. In various embodiments, the storage databases storing the pluralities of path objects and segment objects may be the same database, or different databases. Similarly, the storage device(s) on which the data objects and the segment objects may be stored may be the same storage device(s) or different storage devices.

Thus in some embodiments, in response to the request to verify data integrity of the de-duplication storage system, each respective path object may be retrieved from the storage database and processed. Processing each respective path object may include determining the one or more data objects to which the respective path object has forward links. For each data object to which the respective path object does have a forward link, a command may be added to a command list to verify that the data object has a reverse link to the respective path object. In some embodiments, one or more commands for verifying the integrity of one or more of the data objects may also be added to the list. In some embodiments, the command list for the data objects may be a separate command list from the command list for segment objects described above.

The data object commands may be sorted by determining the data object to which each command corresponds, and sorting the commands in the same order in which the data objects are stored on the storage device. As with the segment object commands, sorting the data object commands may include sorting both commands for verifying that data objects have reverse links to respective path objects and commands for verifying the integrity of path objects.

In some embodiments it may be determined that one or more of the commands in the data object command list are duplicate commands. As described above, the duplicate commands may be de-duplicated, e.g., so that when the commands are processed the duplicate commands are not repeated.

The commands in the command list may then be processed in the sorted order. Similar to the processing of segment object commands, each respective command may be processed according to what type of command it is. For example, each respective command for verifying that a data objects has a reverse link to a respective path object may be processed by determining whether the respective data object to which the respective command corresponds has a reverse link to the respective path object referenced by the command, and adding a reverse link from the respective data object to the respective path object if the reverse link is not present. Each respective command for verifying the integrity of a data object may be processed by calculating a checksum (or performing any other integrity verifying procedure) for the respective data object referred to by the respective command.

BRIEF DESCRIPTION OF THE DRAWINGS

A better understanding of embodiments of the present invention can be obtained when the following detailed description of the preferred embodiment is considered in conjunction with the following drawings, in which.

Figure 1:
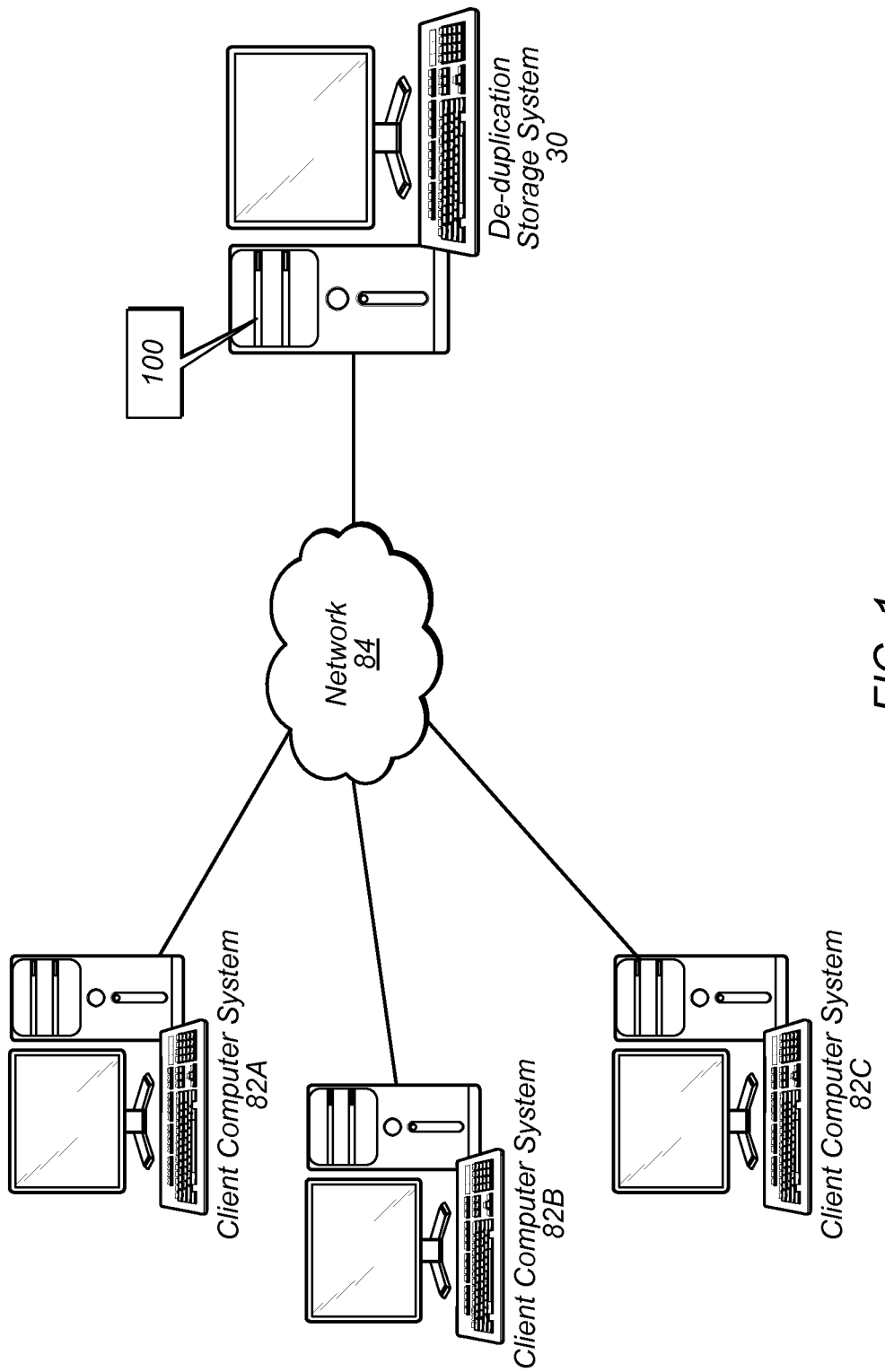
FIG. 1 illustrates an example of a de-duplication storage system according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Various embodiments of a system and method for efficiently analyzing backup objects maintained by a system that de-duplicates data (e.g., a de-duplication storage system) are described herein. In some embodiments, the system and method may include verifying the integrity of links between a hierarchy of objects in a de-duplication storage system. FIG. 1 illustrates an example of a de-duplication storage system 30 according to one embodiment. In some embodiments, the de-duplication storage system 30 may include a plurality of computer systems, e.g., backup servers, although it is also possible that the de-duplication storage system be comprised of a single computer system.

As shown, a plurality of client computer systems 82 are coupled to the de-duplication storage system 30 by a network 84. The client computer systems 82 may in fact be server computers (e.g., storage servers) that store data on behalf of other clients. In various embodiments, the client computer systems 82 may be coupled to the de-duplication storage system 30 by any type of network or combination of networks. For example, the network 84 may include any type or combination of local area network (LAN), a wide area network (WAN), an Intranet, the Internet, etc. Examples of local area networks include Ethernet networks, Fiber Distributed Data Interface (FDDI) networks, and token ring networks. Also, each computer or device may be coupled to the network using any type of wired or wireless connection medium. For example, wired mediums may include Ethernet, Fibre Channel, a modem connected to plain old telephone service (POTS), etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

The de-duplication storage system 30 may execute backup software 100 which receives files from the client computer systems 82 via the network 84 and stores the files, e.g., for backup storage. For example, the backup software 100 may periodically communicate with the client computer systems 82 in order to backup files located on the client computer systems 82.

Figure 2:
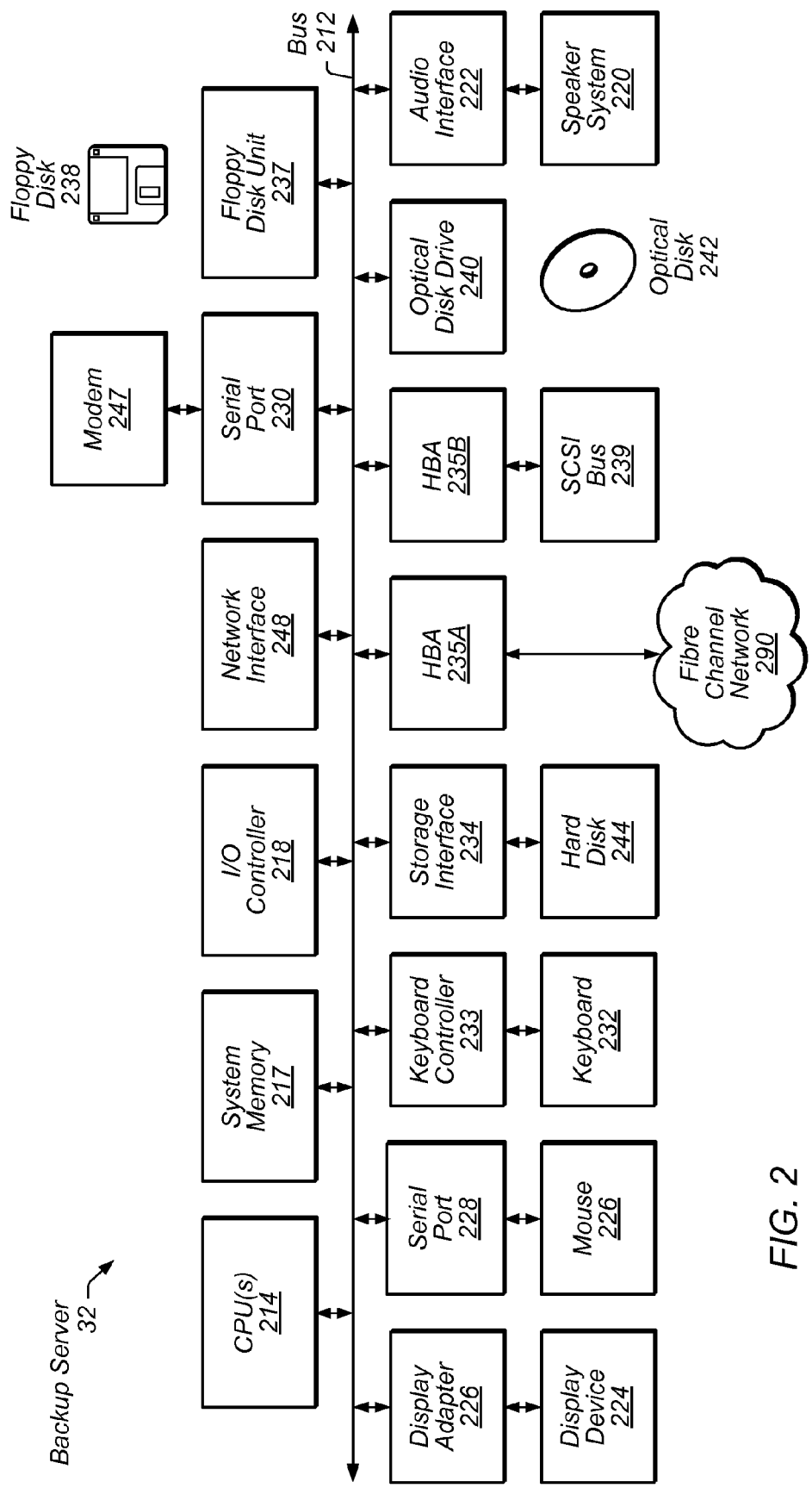
FIG. 2 is a diagram illustrating an example of a backup server computer in the de-duplication storage system.

FIG. 2 is a diagram illustrating an example of a backup server computer 32 in detail according to one embodiment. The de-duplication storage system 30 may include one or more backup server computers 32 which execute the backup software 100 and communicate with the client computer systems 82. In general, the backup server computer 32 may be any type of physical computer or computing device, and FIG. 2 is given as an example only. In the illustrated embodiment, the backup server 32 includes a bus 212 which interconnects major subsystems or components of the backup server 32, such as one or more central processor units 214, system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

The bus 212 allows data communication between central processor(s) 214 and system memory 217, which may include read-only memory (ROM) or flash memory (neither shown), and random access memory (RAM), as previously noted. The RAM is generally the main memory into which software programs are loaded, including the backup software 100. The ROM or flash memory can contain, among other code, the Basic Input-Output system (BIOS) which controls basic hardware operation such as the interaction with peripheral components. Software resident with the backup server 32 is generally stored on and accessed via a computer-readable medium, such as a hard disk drive (e.g., hard disk 244), an optical drive (e.g., optical drive 240), a floppy disk unit 237, or other storage medium. Additionally, software can be received through the network modem 247 or network interface 248.

The storage interface 234, as with the other storage interfaces of the backup server 32, can connect to a standard computer-readable medium for storage and/or retrieval of information, such as one or more disk drives 244. The backup software 100 may store the file data received from the client computer systems 82 on the disk drive(s) 244, e.g., in a database. In some embodiments the backup software 100 may also, or may alternatively, store the file data on a shared storage device. In some embodiments the shared storage device may be coupled to the backup server 32 through the Fibre Channel network 290. In other embodiments the shared storage device may be coupled to the backup server 32 through any of various other types of storage interfaces or networks. Also, in other embodiments the backup software 100 may store the file data on any of various other types of storage devices included in or coupled to the backup server computer 32, such as tape storage devices, for example.

Many other devices or subsystems (not shown) may be connected to the backup server 32 in a similar manner. Conversely, all of the devices shown in FIG. 2 need not be present to practice the present disclosure. The devices and subsystems can be interconnected in different ways from that shown in FIG. 2. Code to implement the backup software 100 described herein may be stored in computer-readable storage media such as one or more of system memory 217, disk drive 244, optical disk 242, or floppy disk 238. The operating system provided on the backup server 32 may be a Microsoft Windows® operating system, UNIX® operating system, Linux® operating system, or another operating system.

Figure 3:
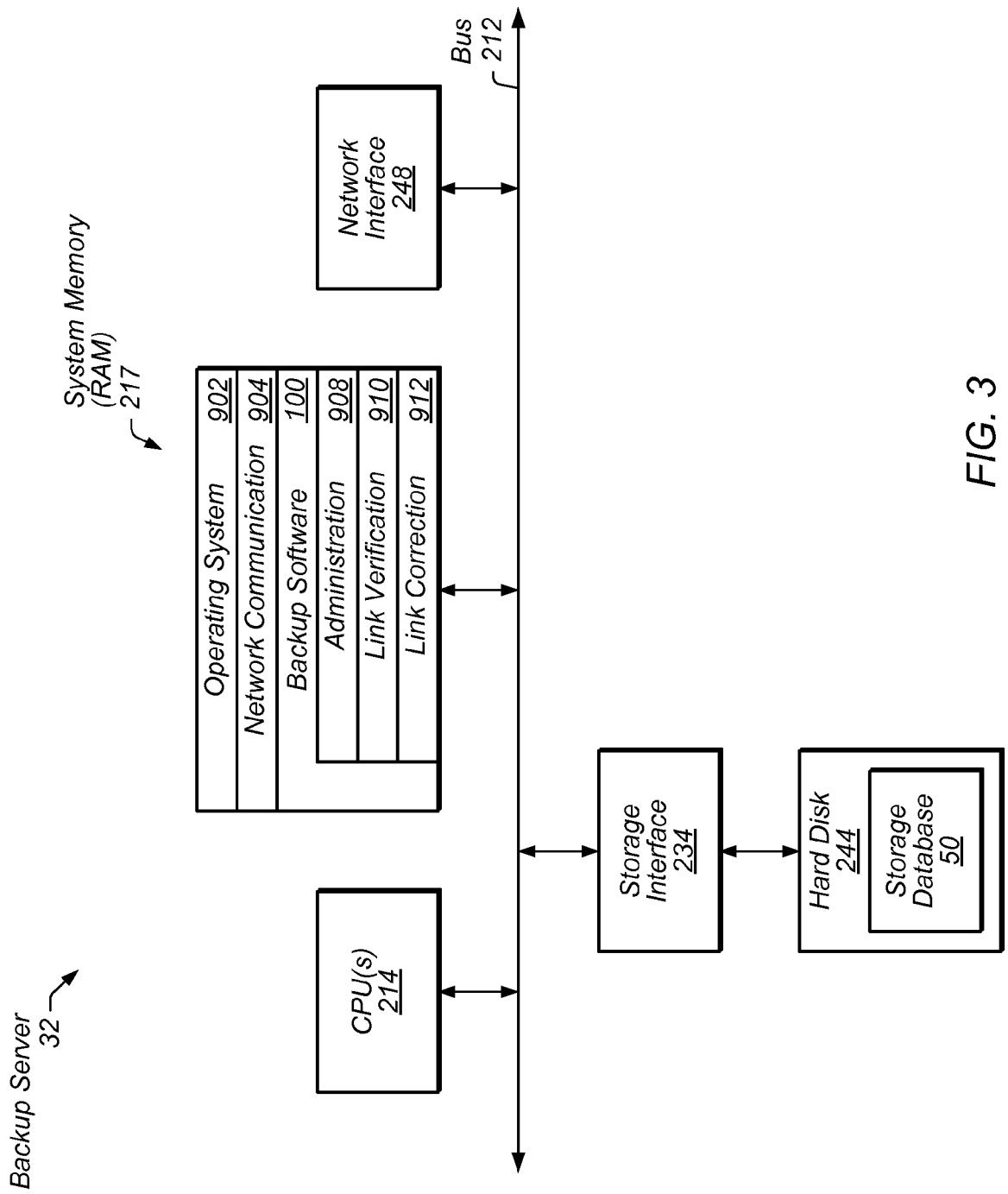
FIG. 3 illustrates various software modules stored in the system memory of the backup server computer.

FIG. 3 illustrates various software modules stored in the system memory 217 of the backup server 32. The program instructions of the software modules may be executable by the one or more processors of the backup server 32. The software modules illustrated in FIG. 3 are given as one example of a software architecture which implements various features described herein. In other embodiments, other software architectures may be used.

In the illustrated embodiment the software of the backup server 32 includes operating system software 902 which manages the basic operation of the backup server 32. The software of the backup server 32 also includes a network communication module 904. The network communication module 904 may be used by the operating system software 902, backup software 100, or other software modules in order to communicate with other computer systems, such as the client computer systems 82. The software of the backup server 32 may also include the backup software 100. The backup software 100 may include various modules such as an administration module 908, a link verification module 910, and a link correction module 912. It should be noted that in some embodiments, one or more of the modules may be combined or split apart into various sub-modules as desired. The functions performed by the various modules of the backup software 100 are described below.

Figure 4:
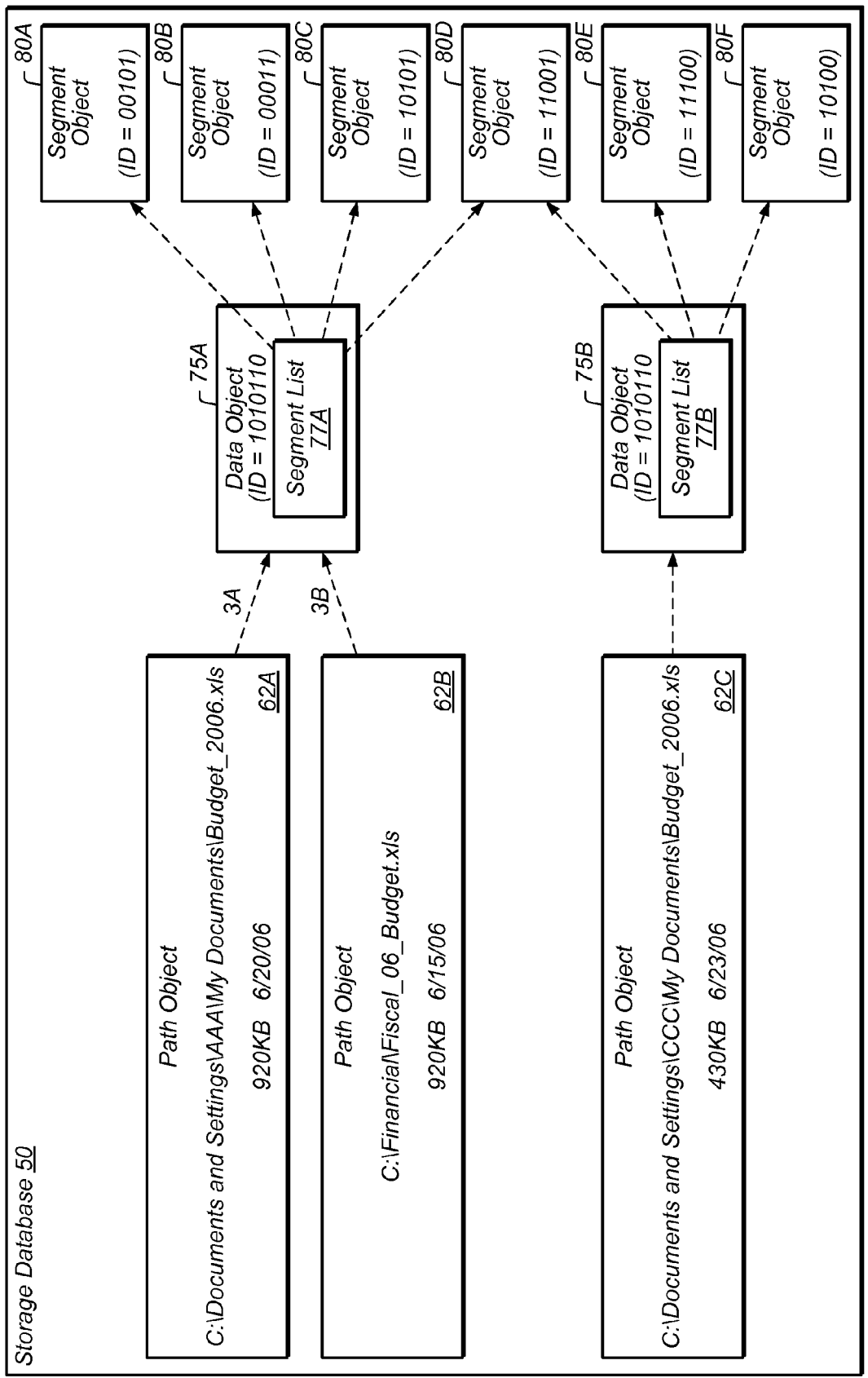
FIGS. 4 and 5 illustrate a storage database in which the backup data received from client computer systems is stored in the de-duplication storage system.

FIG. 4 illustrates a storage database 50 in which the backup data received from the client computer systems is stored in the de-duplication storage system 30. The storage database 50 may be stored on one or more storage devices of one or more of the backup server computers 32, e.g., on one or more of the disk drives 244. In this example, the storage database is organized as a hierarchy of three different types of objects: path objects, data objects, and segment objects. It is noted that in other embodiments other types of object hierarchies may be used, e.g., with different types of objects and/or less than or more than three levels; accordingly, the particular embodiments described in this example should not be considered limiting to the disclosure as a whole.

For each file that is backed up, the de-duplication storage system 30 may store a path object 62 corresponding to the file in the storage database 50. In this example there are three path objects 62A-62C, indicating that three files have been backed up to the de-duplication storage system 30. Each path object 62 may specify various types of metadata about its respective file, such as the path where the file was located on the client computer from which the file was backed up, the size of the file, the date of the file, etc. In addition, the de-duplication storage system 30 may calculate a file ID or file fingerprint for the respective file using the data content of the file, e.g., by applying a hash function to the data content. The de-duplication storage system 30 may then create a link to a data object which corresponds to the file ID. If a data object corresponding to the file ID does not yet exist, then it may first be created, following which a link from the path object to the data object may be added. Otherwise, if a data object corresponding to the file ID does exist then a link from the path object to the existing data object may be added. In the example of FIG. 4, the path objects 62A and 62B represent files having the same underlying data, but different metadata. For example, the two files may have been backed up from two different client computers 82. As indicated by the dashed arrows 3A and 3B, the path objects 62A and 62B both have a link to the same data object 75A. (As used herein, a link refers to information which connects two data objects. For example, the path objects 62A and 62B may simply link to the data object 75A by specifying an ID of the data object 75A.) The path object 62C represents a file having different underlying data than the path objects 62A and 62B, and thus links to a different data object 75B.

The data object 75A may represent an entire file but may not include the actual data of the file. For example, the file data may instead be split into segments, and the data of each segment may be stored in a separate segment object 80. Thus in the example shown in FIG. 4, the data object 75A includes a segment list 77A which links to the individual segment objects which compose the file's data (the four segment objects 80A-80D in this example).

Thus, the storage database 50 may be arranged as a hierarchy of path objects which link to data objects, which in turn link to segment objects. If a particular file needs to be restored to a client computer 82 from the storage database 50, it may thus be reconstructed by first looking up the path object for the file, then using the link from the path object to look up the data object which represents the file's contents, and then using the segment list in the data object to look up the segment objects which include the actual data. The data of the segment objects can then be concatenated to reconstruct the file.

Note that a data object can be linked to by multiple path objects. For example, in FIG. 4 the path objects 62A and 62B both link to the same data object 75A since the two files represented by these path objects both have the same underlying data and differ only in their metadata. Similarly, a segment object can be linked to by multiple data objects. For example, although the overall data contents of the files represented by the data objects 75A and 75B are different, they do share the segment object 80D in common. Thus, both the data object 75A and the data object 75B link to the segment object 80D. This enables data segments to be shared by multiple files without storing multiple copies of identical data segments.

Figure 5:
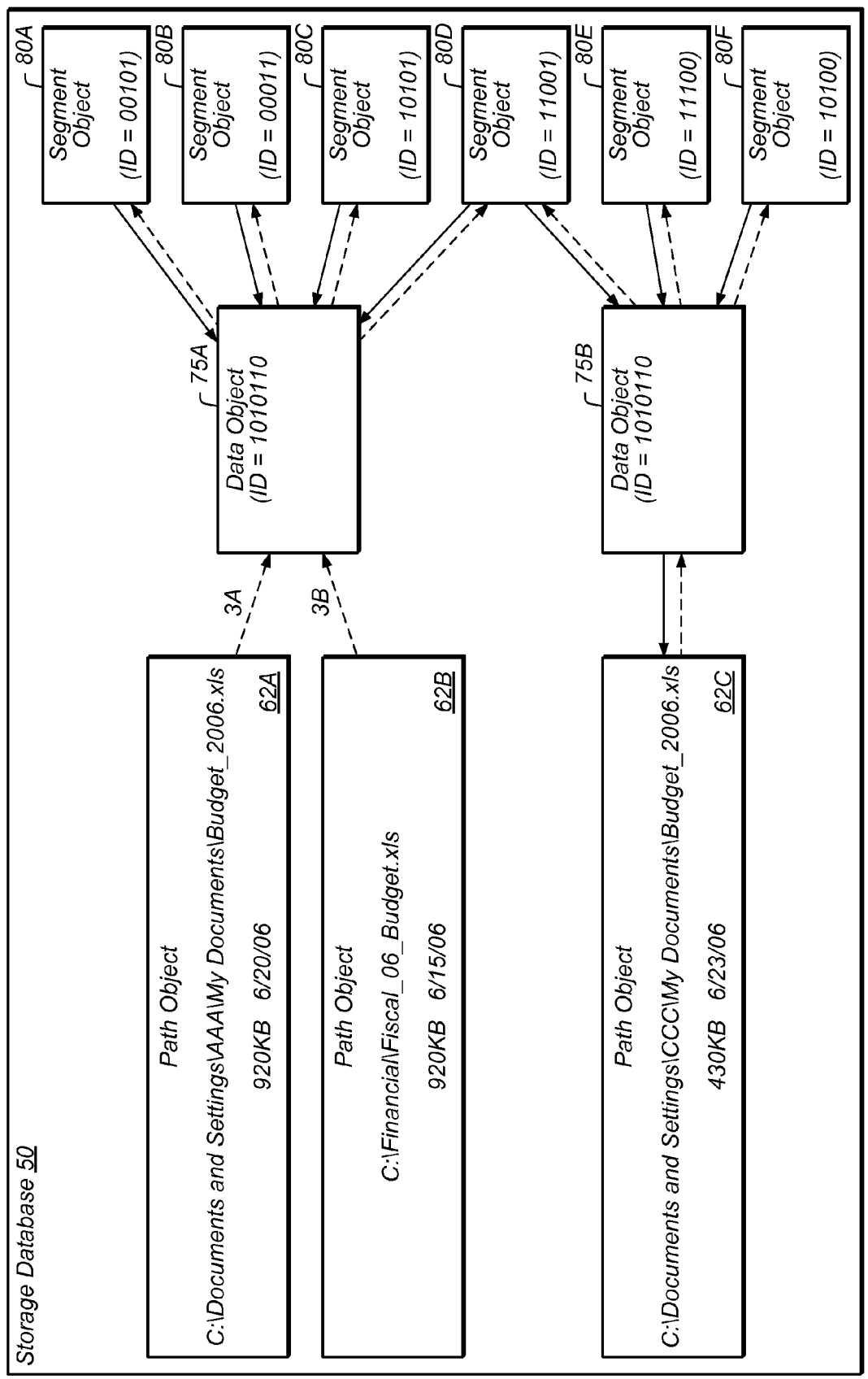

In addition to the forward links from the path objects to data objects, the de-duplication storage system 30 may also create reverse links from the data objects to the path objects. Similarly, the de-duplication storage system 30 may also create reverse links from the segment objects to the data objects. In FIG. 5 the dashed arrows represent the forward links, and the solid arrows represent the reverse links. The reverse links can be used to determine when data objects and segment objects are no longer needed and can be deleted. For example, suppose that the particular file represented by the path object 62A is deleted from the storage database 50. Since the data object 75A still has a reverse link to the other path object 62B, the de-duplication storage system 30 knows that the data object 75A is still in use, and thus does not delete the data object 75A. As another example, suppose that the path object 62C is deleted from the storage database 50. Since there are no other reverse links from the data object 75B to any other path object then the data object 75B can also be deleted. When the data object 75B is deleted the de-duplication storage system 30 also checks to see whether the segment objects linked to by the data object 75B can be deleted as well. Again, this is determined by using the reverse links from the segment objects. The segment objects 80E and 80F have no reverse links to any other data objects besides the data objects 75B, so these segment objects can be deleted. On the other hand, the segment object 80D has a reverse link to the data object 75A as well as the data object 75B. Thus, the segment object 80D cannot be deleted since it is still in use by the data object 75A.

Thus, the storage database 50 may be organized as a hierarchy of objects in which there are both forward links that can be used to re-construct files and reverse links that can be used to determine when objects can be deleted. Occasionally the reverse links can become corrupted. This can occur for example, due to programming errors, operator errors, and hardware failures. Thus, it may be desirable to provide the de-duplication storage system 30 with an ability to check for corruption to ensure that the appropriate reverse links are present and to repair any errors that are found.

A naive process to do this might be to check every path object individually to determine the data objects to which they link, and then to check the referenced data objects to determine whether they have reverse links back to the respective path objects. A similar process could check for reverse links from the segment objects back to the data objects. However, this approach has several shortcomings that make it inefficient for large storage databases in which many objects are stored. For example, if a particular data object is linked to multiple times by different path objects then that data object may be retrieved from disk multiple times and analyzed multiple times. This may cause an unnecessary delay and overlap in work. Furthermore, if such multiple retrieval and analysis were to be extended through to another layer in an object hierarchy (e.g., from data objects to segment objects), the delay and overlap in work would correspondingly multiply. In addition, accessing data per path object may cause extreme random access on disks. A large-scale de-duplication storage system may contain hundreds of millions or even billions of data objects which may be stored in different locations on disk, and the above approach may cause random disk head movement to retrieve the data objects from their disparate locations.

Figure 6:
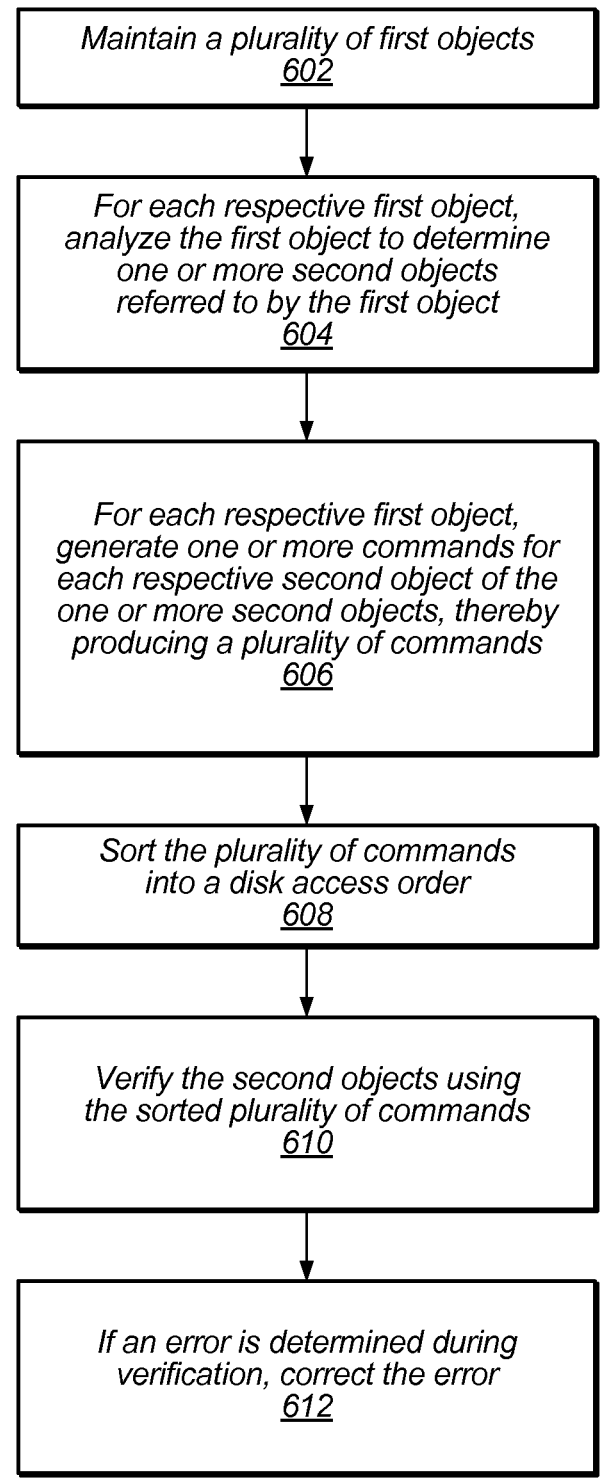
FIGS. 6-8 are flowchart diagrams illustrating various embodiments of methods for efficiently analyzing data objects in a hierarchy of backup objects in the de-duplication storage system.

FIG. 6 is a flow diagram illustrating one embodiment of a method for analyzing backup objects maintained by a de-duplication system. This method may be implemented in the context of a de-duplication storage system 30 using the specific hierarchical levels of path objects, data objects, and segment objects, as described above with respect to FIGS. 4 and 5. However, in some embodiments, the method described with respect to FIG. 6 may be implemented in a broader context, e.g., in any de-duplicating backup system utilizing an object architecture in which different types of objects refer to each other.

The method shown in FIG. 6 may be used in conjunction with any of the computer systems, devices, or circuits shown in the above Figures, among other devices. For example, in some embodiments, the method of FIG. 6 may be implemented by the backup software 100 executing on one or more backup server computers 32 of the de-duplication storage system 30. In various embodiments, some of the method elements shown may be performed concurrently, performed in a different order than shown, or omitted. Additional method elements may also be performed as desired. As shown, this method may operate as follows.

In 602, a plurality of first backup objects may be maintained. Each first object may refer to one or more second objects. Accordingly, there may be a plurality of maintained second objects. In one embodiment, each second object may refer back to at least one first object. In one embodiment, the references may be pointers to memory addresses. As described herein, the first and second objects may be path objects and data objects or data objects and segment objects, among other possibilities, as desired.

For each respective first object, in 604, the respective first object may be analyzed to determine the second object(s) referred to by the respective first object, and in 606, one or more commands may be generated for each respective second object. The commands may be used for verifying that the respective second object refers back to the respective first object. Accordingly, the analysis and generation in 604 and 606 may result in the production of a plurality of commands.

As a simple example, there may be three first objects, and each first object may refer to two separate second objects (for a total of 6 second objects). Each second object may refer back to its parent first object. Correspondingly, in 604, the pairs of second objects may be determined for each first object, and in 606, a command may be generated for each second object to verify that the second object refers back to the proper first object. Thus, for this simple example, there may be a total of six commands. However, as described herein, different first objects may refer to the same second object.

Additionally, further commands may be generated for inclusion in the plurality of commands. For example, commands may be generated to verify the integrity of one of the second objects.

In 608, the plurality of commands may be sorted into a disk access order and, in 610, the method may verify the second objects based on the plurality of commands. As indicated above, the verifications may correspond to integrity of the second object or accuracy of the reference(s) of the second object, among other possibilities. Thus, the commands may be sorted in a manner that makes the verification more efficient, e.g., by ensuring that the order of the commands is in an order that corresponds to storage of files to which the objects refer.

In one embodiment, the plurality of commands may be executable to perform the verification in 610. However, the plurality of commands may simply store information which is usable to perform the verification in 610 rather than being executable themselves.

In some embodiments, the method may determine that one or more of the plurality of commands are duplicate commands. Since the commands are sorted in disc access order, this determination may be performed easily, since the duplicate commands should be adjacent to one another. Correspondingly, based on this determination, the verification in 610 may not repeat execution of the duplicate commands.

In 612, if an error is determined (e.g., a reference error) in one or more second objects during the verification in 610, the error may be corrected. For example, a reference error from a second object to a first object may be determined based on the verification and the error may be corrected based on the determination. The reference error might be that a second object to which a first object refers does not refer back to the first object. In this case correcting the error could include adding to the second object a reference back to the first object. Another possible error could be that no first objects refer to a second object. In this case the second object should have been deleted, and correcting the error could include deleting the second object.

As described below, the method of FIG. 6 may be performed on various hierarchies of data objects. For example, in one embodiment, the first objects may be path objects and the second objects may be data objects, as described in regard to FIG. 7 below. Alternatively, the first objects may be data objects and the second objects may be segment objects, as described in regard to FIG. 8 below. The method may be performed for either or both of these levels, in parallel or in sequence, as desired. In addition, some embodiments are envisioned in which, while performing the process for multiple object layers, different portions of the multiple processes may overlap in time in order to further increase the efficiency of the verification. For example, while verifying that each second object refers back to the appropriate first object(s) (e.g., part of the process for verification between first objects and second objects), each second object could also be analyzed for references to one or more third objects, and commands could be generated for verifying these third objects (e.g., part of the process for verification between second objects and third objects). In this case, by performing all of these steps on the second objects during a single sequential read of a disk, the process may be even more efficient.

In various embodiments the method of FIG. 6 may increase the efficiency of verifying references and/or integrity of backup objects in a de-duplication system. A first advantage is that the second objects may be retrieved and verified in the order in which they reside on disk, since the verification commands may be sorted in the order corresponding to the disk storage locations of the second objects. This may avoid the need for the read head of the disk drive to move randomly across the disk to retrieve the second objects. A second advantage is that all verification commands for a given second object may be performed by loading that second object from disk into memory just once, e.g., instead of loading it into memory multiple times, as might be required if the commands were not sorted and multiple reverse links from the data object needed to be verified. Furthermore, the method may enable errors to be corrected, e.g., by adding references back from second objects to first objects if such back references should be present but are not.

As noted above, FIGS. 7 and 8 are flowcharts illustrating a more specific method directed to a system using the hierarchical levels of path objects, data objects, and segment objects, as described above with respect to FIGS. 4 and 5. This efficient method for checking the integrity of reverse links in a hierarchy of objects in a de-duplication storage system is described below.

As indicated in block 700, the backup software 100 may receive a request to verify the integrity of reverse links from data objects to path objects. For example, in some embodiments the request may be received through the administration module 908 of the backup software 100.

As indicated in block 701, in response to the request, the de-duplication storage system 30 may analyze each path object in the storage database 50 to determine the data object(s) linked to by the path object, and may then add a command to a command list to verify that the data object has a reverse link to the path object. The function of block 701 may be implemented by the link verification module 910 of the backup software 100.

Once the list of commands has been created by analyzing each of the path objects, the de-duplication storage system 30 may sort the commands in the list so that the commands are in the same order in which the corresponding data objects are stored on disk, as indicated in block 703. For example, suppose that a first command 1 is to verify that a data object 75E has a reverse link to a path object 62E, a second command 2 is to verify that a data object 75F has a reverse link to a path object 62F, and a third command 3 is to verify that a data object 75G has a reverse link to a path object 62G. Suppose also that the data object 75F is stored on disk at a particular location, followed by the data object 75E, and then the data object 75G. Thus, the commands would be sorted in the order: command 2, followed by command 1, followed by command 3. The function of block 703 may be implemented by the link verification module 910 of the backup software 100.

In some embodiments, one or more commands may also be generated to verify the integrity of one or more of the data objects. For example, in analyzing each of the path objects, the de-duplication storage system 30 may generate a command to verify the integrity of a data object for each of the data objects to which each respective path object links. Verifying the integrity of an object could be performed in any of various ways: a checksum (e.g., a cyclic redundancy check) could be calculated for the object, the object could simply be read to determine that no errors (e.g., hardware or software errors) are generated, or any of various other integrity verification procedures could be performed. Any such integrity verification commands may be sorted together with the commands for verifying reverse links to generate a single sorted list of commands that can be performed (e.g., executed) in a disk-access order (e.g., in the order in which the corresponding data objects are stored on disk).

In addition, in some embodiments, the method may include determining whether there are any duplicate commands in the plurality of commands. Since more than one path object may link to a data object (e.g., as shown in FIGS. 4 and 5), it is possible that in analyzing different path objects, multiple identical commands (e.g., multiple commands to verify the integrity of a single data object) may be added to the command list. Performing such commands multiple times may be extraneous and unnecessary. Accordingly, in some embodiments, such duplicate commands may themselves be de-duplicated, e.g., may be removed from the command list and/or may simply not be repeated as the command list is processed.

As indicated in block 705, the de-duplication storage system 30 may then process the commands in the sorted order. In the example above, the command 2 would be processed first. The command 2 says to verify that the data object 75F has a reverse link to the path object 62F. Thus, the de-duplication storage system 30 may retrieve the data object 75F from the storage pool 50 and check for the presence of this reverse link. If it is present then no action needs to be taken. Otherwise, the de-duplication storage system 30 adds the reverse link to correct the data integrity error. After the command 2 has been processed the de-duplication storage system 30 then continues to process the other commands in the list in their sorted order. The function of block 705 may be implemented by the link correction module 912 of the backup software 100.

Figure 8:
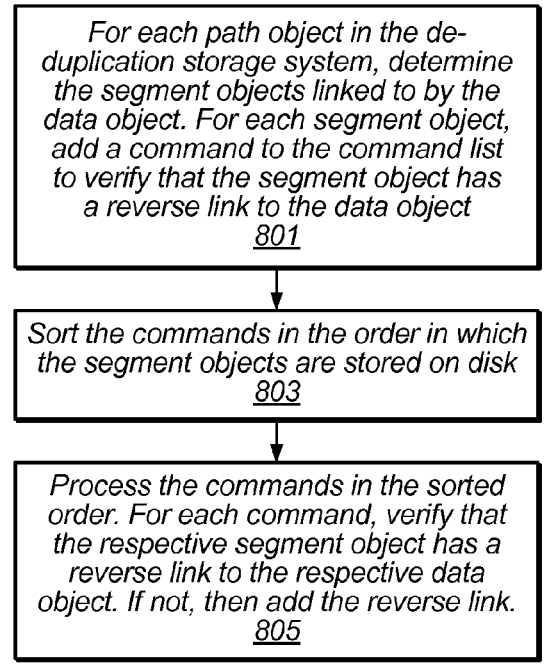

An analogous method of checking the integrity of reverse links from segment objects to data objects is illustrated in the flowchart of FIG. 8. As indicated in block 801, for each data object in the storage pool 50, the de-duplication storage system 30 may determine the segment objects linked to by the data object. For each of these segment objects the de-duplication storage system 30 may add a command to a command list to verify that the segment object has a reverse link to the data object.

As indicated in block 803, the de-duplication storage system 30 may then sort the commands in the order in which the segment objects are stored on disk.

As indicated in block 805, the de-duplication storage system 30 may then process the commands in the sorted order. For each command, the de-duplication storage system 30 may verify that the respective segment object referenced by the command has a reverse link to the respective data object. If not, then the reverse link may be added to correct the error.

Figure 7:
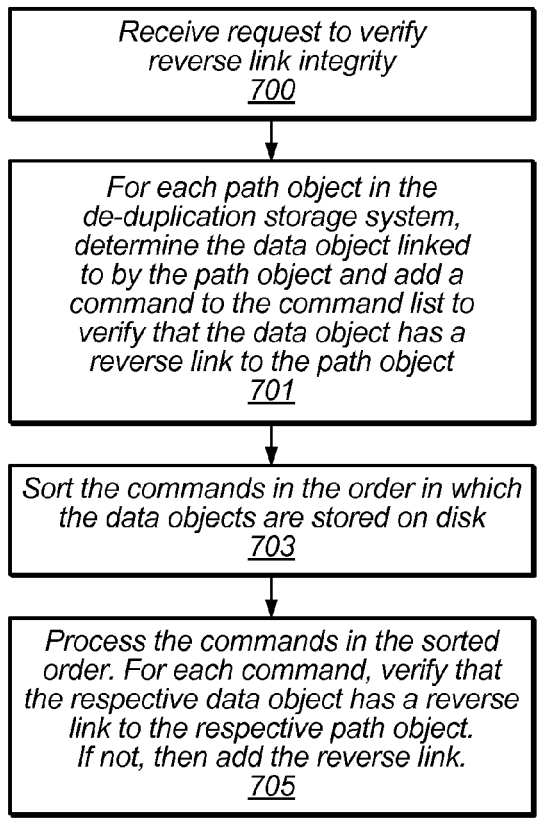

In some embodiments, the methods of FIGS. 7 and 8 may be implemented together. For example, as described in FIG. 7, each of the reverse links corresponding to forward links from path objects to data objects may be verified, and in some embodiments the integrity of one or more of the data objects may be verified. The reverse links corresponding to forward links from those data objects to segment objects may then be verified, and in some embodiments the integrity of one or more of the segment objects may be verified. In other words, in some embodiments, a "cascading" of verification may be performed from level to level. As one example, a command generated in response to analyzing a path object might request verification of a data object, including a command for verifying that the data object includes a reference back to the path object, a command for verifying the integrity of the data object, and/or a command requesting that any segment objects referenced by the data object be verified. If the command cascades (e.g., if there is a command requesting a segment object referenced by the data object be verified), further commands may be generated. For example, commands may be generated for verifying that the segment object includes a reference back to the data object and for verifying the integrity of the segment object. It should be noted that even in such "cascading" command sequences, not all of the commands just described may be necessary or requested. In addition, it should be noted that some of the above described commands may be combined together, with each other and/or with commands generated on behalf of other path objects, e.g., to de-duplicate duplicate commands.

In some embodiments, the processes of FIGS. 7 and 8 may be entirely analogous, and any of the embodiments described with respect to FIG. 7, e.g., relating to path objects and data objects, may similarly be implemented with respect to the process of FIG. 8, e.g., relating to data objects and segment objects. Furthermore, the process could analogously be extended to one or more further hierarchical layers of objects, above or below the objects described herein, if desired. Alternatively, in some embodiments there may be one or more differences in the processes as applied between layers of objects, if desired.

As previously noted, one possible process for dealing with reverse link verification and integrity verification of backup objects (e.g., path objects, data objects, and/or segment objects) in a de-duplication system might include verifying links for a path object, verifying the integrity of the linked data objects, and further verifying links for those linked data objects and verifying the integrity of the linked segment objects, for each path object sequentially. This approach will be referred to in the below discussion as a "first verification method". The following example is intended to provide a rough comparison of the speed of such a process to the speed of a link- and integrity-verification process according to the present disclosure in one particular embodiment. However, it should be noted that because the following example is representative primarily of one particular embodiment, it should not be considered limiting to the disclosure as a whole.

Consider a verification request for an entire storage, including verifying the forward and backward references from path objects to data objects, from data objects to segment objects, and also verifying CRCs of the raw data. It may be reasonable to assume that the disk is the bottleneck for these operations, since CRC calculation is typically much faster than reading from disk. It may also be reasonable to assume a de-duplication factor of 30, e.g., meaning that, if all of the data available were to be restored, 30 times more data would be restored than is actually stored in our storage; this may be a fairly average de-duplication factor for some de-duplication engines. Now consider a RAID capable of performing a random access in 2.5 ms and reading data at 300 MB/s. For simplicity's sake, assume that every data object points to just one segment object. This approximation may be reasonable for remote office scenarios where primarily individual files are backed up. A further approximation that may be realistic for remote office scenarios (e.g., in which individual files and not disk images are being backed up) may be that a path object is 400 B, a data object is 100 B, and a segment object is 100 KB.

Consider the first verification method. Iteration over the path objects may be performed in disk order, so fetching one PO may consume 1.3 us. That path object points to a data object, which will consume 2.5 ms random access time+0.33 us to fetch. That data object points to one segment object. Fetching that again costs 2.5 ms random access time+0.3 ms. So, verifying one path object will take approximately 5.3 ms.

Now consider how much time would be needed per path object according to an embodiment of this disclosure. Again, sequential iteration over the path object may consume 1.3 us. Iteration over the data object would also be performed sequentially, eliminating the random access time, so the time for this step would be 0.33 us. Similarly, sequential iteration over the segment object would take 0.3 ms. However, the time to sort the operations for the data objects and the segment objects so we can apply them sequentially to the data objects and segment objects must also be considered. A typical sorting tool in a de-duplication engine may be capable of sorting hundreds of millions of entries in a reasonable time. For example, a modern machine may achieve a sorting speed of around 60,000 entries/s (for a set of 350,000,000 entries). That corresponds to approximately 17 us per entry. In addition, if no duplicate commands are repeated, the effect of this in reducing the average execution time of verifying one path object should be considered. As noted above, in this example a de-duplication factor of 30 is assumed. For simplicity, further assume that that sqrt (30) (approx. 5.47) of that de-duplication occurs on the data object level and sqrt (30) occurs on the segment object level. In this case, in the set of data object verification commands there would be approximately 5.47 commands for the each data object. If those commands are merged, and the data object verification is only performed once, that would provide a reduction of a factor of 5.47 at the data object level. The benefit would further propagate at the segment object level, resulting in a reduction factor of 30 at the SO level. So the total average execution time for verifying one path object would be:

$$1.3 \text{ us}+(17 \text{ us}+0.33 \text{ us})/5.47+(17 \text{ us}+0.3 \text{ ms})/30=15 \text{ us}$$

Thus, at least in this particular example, an embodiment of the method disclosed herein may perform such a verification process approximately 353 times than the first verification method. It should be noted that the difference factor between the methods may in some embodiments be even higher, e.g., if more than one random access would be required to a path object, data object, and/or segment object. This dramatic increase in efficiency may accordingly allow much larger portions of a de-duplicated backup, potentially up to and including an entire de-duplicated backup, to be verified, whereas the speed limitations of the first verification method might only allow for small portions of a de-duplicated backup to be verified.

Various embodiments of a method for verifying the data integrity of a hierarchy of objects in a de-duplication storage system 30 have been described above. The method may be implemented by various devices operating in conjunction with each other, and may cause a transformation to occur in one or more of the devices. For example, one or more storage devices of one or more backup server computers 32 in the de-duplication storage system may be transformed by changing data stored on the storage devices, e.g., to correct errors by adding missing reverse links.

It is noted that various functions described herein may be performed in accordance with cloud-based computing techniques or software as a service (SaaS) techniques in some embodiments. For example, in some embodiments the functionality of the backup software 100 may be provided as a cloud computing service.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for purposes of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable other skilled in the art to best utilize the invention and various embodiments with various modifications as may be suited to the particular use contemplated.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer-accessible storage medium comprising program instructions for analyzing backup objects maintained by a de-duplication server, wherein the program instructions are executable by a processor to:

maintain a plurality of first backup objects, wherein each first backup object comprises one or more references to one or more second backup objects of a plurality of second backup objects, and wherein each second backup object comprises at least one reference back to a first backup object, wherein references comprise pointers to memory addresses of referenced backup objects, wherein the first backup objects are backup objects at a higher hierarchical level than the second backup objects in a data duplication system;

for each respective first backup object of the plurality of first backup objects:

analyze the respective first backup object to determine the one or more second backup objects referred to by the respective first backup object;

generate a first command for each respective second backup object of the one or more second backup objects, wherein the first command is configured for use in verifying that the respective second backup object refers back to the respective first backup object;

wherein the analyzing and the generating for each of the plurality of first backup objects produces a plurality of commands, each command of the plurality of commands being associated with a second backup object;

sort the plurality of commands into a storage device access order, wherein the storage device access order is an order of sequential storage locations on the storage device for the second backup objects; and verify that each second backup object of the plurality of second backup objects refers back to one or more first backup objects that refer to the second backup object, wherein the verification implements the sorted plurality of commands in the storage device access order.

2. The storage medium of claim 1, wherein the program instructions are further executable to:

for at least one second backup object, generate at least one second command to verify the integrity of the at least one second backup object;

wherein the at least one second command is also comprised in the plurality of commands, wherein the program instructions for sorting the plurality of commands into a storage device access order sort the first commands and the at least one second command into the storage device access order;

verify the integrity of the at least one second backup object using the at least one second command in the sorted plurality of commands.

3. The storage medium of claim 1, wherein the program instructions are further executable to:

determine that one or more of the plurality of commands are duplicate commands;

wherein the verification does not repeat execution of the duplicate commands.

4. The storage medium of claim 1, wherein the program instructions are further executable to:

determine a reference error from a second backup object to a first backup object based on the verification; and correct the error based on the determination.

5. The storage medium of claim 1, wherein the plurality of first backup objects comprise path objects, wherein the plurality of second backup objects comprise data objects, wherein each path object represents metadata of a respective file, and wherein each data object represents data of one version of the respective file.

6. The storage medium of claim 1, wherein the plurality of first backup objects comprise data objects, wherein the plurality of second backup objects comprise segment objects, wherein each data object represents data of one version of a respective file, and wherein each segment object corresponds to raw data of the respective file.

7. The storage medium of claim 1, wherein each of the plurality of second backup objects refers to one or more third backup objects of a plurality of third backup objects, wherein each third backup object refers back to at least one second backup object, and wherein the program instructions are further executable to:
   for each respective second backup object of the plurality of second backup objects:
      analyze the respective second backup object to determine the one or more third backup objects referred to by the respective second backup object;
      generate a second command for each respective third backup object of the one or more third backup objects, wherein the second command is configured for use in verifying that the respective third backup object refers back to the respective second backup object;
   wherein the analyzing and the generating for each of the plurality of second backup objects produces a second plurality of commands;
   sort the second plurality of commands into a storage device access order; and
   verify that each third backup object of the plurality of third backup objects refers back to second backup objects that refer to the third backup object, wherein the verification uses the sorted second plurality of commands.

8. The storage medium of claim 7, wherein the plurality of first backup objects comprise path objects, wherein the plurality of second backup objects comprise data objects, wherein the plurality of third backup objects comprise segment objects, wherein each path object represents metadata of a respective file, wherein each data object represents data of one version of the respective file, and wherein each segment object corresponds to raw data of the respective file.

9. A system for analyzing backup objects maintained by a de-duplication server, the system comprising:
   one or more processors;
   a computer-accessible storage medium comprising program instructions executable by the one or more processors to:
      maintain a plurality of first backup objects, wherein each first backup object comprises one or more references to one or more second backup objects of a plurality of second backup objects, and wherein each second backup object comprises at least one reference back to a first backup object, wherein references comprise pointers to memory addresses of referenced backup objects, wherein the first backup objects are backup objects at a higher hierarchical level than the second backup objects in a data duplication system;
      for each respective first backup object of the plurality of first backup objects:
         analyze the respective first backup object to determine the one or more second backup objects referred to by the respective first backup object;
         generate a first command for each respective second backup object of the one or more second backup objects, wherein the first command is configured for use in verifying that the respective second backup object refers back to the respective first backup object;
      wherein the analyzing and the generating for each of the plurality of first backup objects produces a plurality of commands, each command of the plurality of commands being associated with a second backup object;
      sort the plurality of commands into a storage device access order, wherein the storage device access order is an order of sequential storage locations on the storage device for the second backup objects; and
      verify that each second backup object of the plurality of second backup objects refers back to one or more first backup objects that refer to the second backup object, wherein the verification implements the sorted plurality of commands in the storage device access order.

10. The system of claim 9, wherein the program instructions are further executable to:
    for at least one second backup object, generate at least one second command to verify the integrity of the at least one second backup object;
    wherein the at least one second command is also comprised in the plurality of commands, wherein the program instructions for sorting the plurality of commands into a storage device access order sort the first commands and the at least one second command into the storage device access order;
    verify the integrity of the at least one second backup object using the at least one second command in the sorted plurality of commands.

11. The system of claim 9, wherein the program instructions are further executable to:
    determine that one or more of the plurality of commands are duplicate commands;
    wherein the verification does not repeat execution of the duplicate commands.

12. The system of claim 9, wherein the program instructions are further executable to:
    determine a reference error from a second backup object to a first backup object based on the verification; and
    correct the error based on the determination.

13. The system of claim 9, wherein the plurality of first backup objects comprise path objects, wherein the plurality of second backup objects comprise data objects, wherein each path object represents metadata of a respective file, and wherein each data object represents data of one version of the respective file.

14. The system of claim 9, wherein the plurality of first backup objects comprise data objects, wherein the plurality of second backup objects comprise segment objects, wherein each data object represents data of one version of a respective file, and wherein each segment object corresponds to raw data of the respective file.

15. The system of claim 9, wherein each of the plurality of second backup objects refers to one or more third backup objects of a plurality of third backup objects, wherein each third backup object refers back to at least one second backup object, and wherein the program instructions are further executable to:
    for each respective second backup object of the plurality of second backup objects:
       analyze the respective second backup object to determine the one or more third backup objects referred to by the respective second backup object;
       generate a second command for each respective third backup object of the one or more third backup objects, wherein the second command is configured for use in verifying that the respective third backup object refers back to the respective second backup object;
wherein the analyzing and the generating for each of the plurality of second backup objects produces a second plurality of commands;
sort the second plurality of commands into a storage device access order;
verify that each third backup object of the plurality of third backup objects refers back to second backup objects that refer to the third backup object, wherein the verification uses the sorted second plurality of commands.

16. The system of claim 15, wherein the plurality of first backup objects comprise path objects, wherein the plurality of second backup objects comprise data objects, wherein the plurality of third backup objects comprise segment objects, wherein each path object represents metadata of a respective file, wherein each data object represents data of one version of the respective file, and wherein each segment object corresponds to raw data of the respective file.

17. A computer-implemented method for verifying data integrity of a hierarchy of objects in a de-duplication storage system, the method comprising:
receiving a request to verify data integrity of a de-duplication storage system, wherein the de-duplication storage system includes a storage database storing a plurality of data objects, wherein each data object represents a particular file and includes one or more forward links to one or more segment objects which each include a data segment of the file, wherein the segment objects are located in a particular order on a storage device;
in response to the request, retrieving each respective data object from the storage database and processing the respective data object by:
determining the one or more segment objects to which the respective data object has forward links;
for each segment object to which the respective data object has a forward link, adding a first command to a first command list to verify that the segment object has a reverse link to the respective data object;
sorting the commands in the first command list by determining the segment object to which each command corresponds, and sorting the commands in the same order in which the segment objects are located on the storage device;
processing the commands in the first command list in the sorted order, wherein processing each respective first command includes:
determining whether the respective segment object to which the respective first command corresponds has a reverse link to the respective data object referenced by the first command; and
adding a reverse link from the respective segment object to the respective data object if the reverse link is not present.

18. The computer-implemented method of claim 17, wherein the program instructions are further executable to:
determine that one or more of the commands in the first command list are duplicate commands;
wherein the processing does not repeat the duplicate commands.

19. The computer-implemented method of claim 17, wherein the de-duplication storage system includes a storage database storing a plurality of path objects, wherein each path object comprises meta-data for a particular file and includes one or more forward links to one or more data objects, wherein the data objects are located in a particular order on a storage device, wherein the method further comprises:
in response to the request to verify data integrity of the de-duplication storage system, retrieving each respective path object from the storage database and processing the respective path object by:
determining the one or more data objects to which the respective path object has forward links;
for each data object to which the respective path object has a forward links, add a second command to a second command list to verify that the data object has a reverse link to the respective path object;
sorting the commands in the second command list by determining the data object to which each command corresponds, and sorting the commands in the same order in which the data objects are located on the storage device;
processing the commands in the second command list in the sorted order, wherein processing each respective second command includes:
determining whether the respective data object to which the respective second command corresponds has a reverse link to the respective path object referenced by the second command; and
adding a reverse link from the respective data object to the respective path object if the reverse link is not present.

20. The computer-implemented method of claim 17, further comprising:
for one or more of the segment objects, adding a second command to the first command list to verify the integrity of the data segments included in the one or more segment objects;
wherein sorting and processing the commands in the first command list include sorting and processing both the first commands and the second commands.

* * * * *